United States Patent
Mori et al.

(10) Patent No.: US 9,630,150 B2
(45) Date of Patent: *Apr. 25, 2017

(54) POROUS POLYTETRAFLUOROETHYLENE MEMBRANE, METHOD FOR PRODUCING THE SAME, GAS-PERMEABLE MEMBRANE AND VENTILATION MEMBER USING THE SAME

(71) Applicant: NITTO DENKO CORPORATION, Ibaraki-shi, Osaka (JP)

(72) Inventors: Masaaki Mori, Osaka (JP); Yoshiki Ikeyama, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/418,043

(22) PCT Filed: Jul. 26, 2013

(86) PCT No.: PCT/JP2013/004562
§ 371 (c)(1),
(2) Date: Jan. 28, 2015

(87) PCT Pub. No.: WO2014/020882
PCT Pub. Date: Feb. 6, 2014

(65) Prior Publication Data
US 2015/0238909 A1    Aug. 27, 2015

(30) Foreign Application Priority Data
Aug. 2, 2012  (JP) .................. 2012-171795

(51) Int. Cl.
*B01D 53/22* (2006.01)
*B01D 67/00* (2006.01)
(Continued)

(52) U.S. Cl.
CPC ..... *B01D 67/0088* (2013.01); *B01D 67/0027* (2013.01); *B01D 69/06* (2013.01);
(Continued)

(58) Field of Classification Search
CPC .... B01D 67/0088; B01D 71/36; B01D 69/06; B01D 67/0027; B01D 2323/04;
(Continued)

(56) References Cited

U.S. PATENT DOCUMENTS 3,455,889 A * 7/1969 Coleman ............... C08F 220/18
526/245
4,110,392 A * 8/1978 Yamazaki ..................... 264/127
(Continued)

FOREIGN PATENT DOCUMENTS

EP    2 306 751     4/2011
JP    4-506982     12/1992
(Continued)

OTHER PUBLICATIONS

Machine translator Tokuda JP 2007-016058 Jan. 25, 2007 14 pages.*
(Continued)

*Primary Examiner* — Anthony Shumate
(74) *Attorney, Agent, or Firm* — Hamre, Schumann, Mueller & Larson, P.C.

(57) ABSTRACT

The present invention provides a porous polytetrafluoroethylene membrane having a surface coated with a liquid-repellent agent. In this porous polytetrafluoroethylene membrane, the liquid-repellent agent is a polymer obtained by polymerization of monomers consisting essentially of $CH_2=CHCOOCH_2CH_2C_6F_{13}$. This porous polytetrafluoroethylene membrane is suitable for use as a gas-permeable membrane that allows passage of gases but prevents entry of liquids and/or dust, specifically as a waterproof sound-transmitting membrane, a waterproof gas-permeable membrane, or a dustproof gas-permeable membrane.

7 Claims, 3 Drawing Sheets

(51) Int. Cl.
  *B01D 71/36* (2006.01)
  *C08J 7/04* (2006.01)
  *B01D 69/06* (2006.01)
  *B32B 5/02* (2006.01)
  *B32B 5/16* (2006.01)
  *B32B 15/08* (2006.01)
  *B32B 27/08* (2006.01)
  *B32B 27/12* (2006.01)
  *B32B 27/14* (2006.01)
  *B32B 27/28* (2006.01)
  *B32B 27/32* (2006.01)
  *B32B 27/34* (2006.01)
  *B32B 27/36* (2006.01)

(52) U.S. Cl.
  CPC .............. *B01D 71/36* (2013.01); *B32B 5/022* (2013.01); *B32B 5/024* (2013.01); *B32B 5/16* (2013.01); *B32B 15/08* (2013.01); *B32B 27/08* (2013.01); *B32B 27/12* (2013.01); *B32B 27/14* (2013.01); *B32B 27/281* (2013.01); *B32B 27/32* (2013.01); *B32B 27/322* (2013.01); *B32B 27/34* (2013.01); *B32B 27/36* (2013.01); *C08J 7/047* (2013.01); *B01D 2323/04* (2013.01); *B01D 2325/24* (2013.01); *B01D 2325/38* (2013.01); *B32B 2255/26* (2013.01); *B32B 2264/0257* (2013.01); *B32B 2307/724* (2013.01); *B32B 2307/7265* (2013.01); *B32B 2457/00* (2013.01); *C08J 2327/18* (2013.01); *C08J 2433/16* (2013.01)

(58) Field of Classification Search
  CPC ............ B01D 2325/24; B01D 2325/38; B32B 5/022; B32B 5/024; B32B 5/16; B32B 15/08; B32B 27/08; B32B 27/12; B32B 27/14; B32B 27/281; B32B 27/32; B32B 27/322; B32B 27/34; B32B 27/36; B32B 2255/26; B32B 2264/0257; B32B 2307/724; B32B 2307/7265; B32B 2457/00; C08J 7/047
  See application file for complete search history.

(56) References Cited

U.S. PATENT DOCUMENTS

| | | | | |
|---|---|---|---|---|
| 5,156,780 | A * | 10/1992 | Kenigsberg et al. | 264/424 |
| 5,376,441 | A * | 12/1994 | Wu et al. | 428/304.4 |
| 5,385,694 | A * | 1/1995 | Wu et al. | 516/58 |
| 5,403,524 | A * | 4/1995 | Burger et al. | 264/424 |
| 5,460,872 | A * | 10/1995 | Wu et al. | 428/304.4 |
| 5,462,586 | A | 10/1995 | Sugiyama et al. | |
| 5,539,047 | A * | 7/1996 | Wu et al. | 524/805 |
| 5,539,072 | A * | 7/1996 | Wu | 526/304 |
| 5,939,198 | A * | 8/1999 | Howard et al. | 428/421 |
| 6,156,389 | A * | 12/2000 | Brown | B01L 3/50 427/295 |
| 8,141,678 | B2 * | 3/2012 | Ikeyama et al. | 181/175 |
| 8,178,023 | B2 * | 5/2012 | Ikeyama | 264/271.1 |
| 8,729,321 | B2 * | 5/2014 | Furuta | C07C 17/278 570/134 |
| 8,821,226 | B2 * | 9/2014 | Yano et al. | 454/143 |
| 2003/0219588 | A1 * | 11/2003 | Ogawa et al. | 428/308.4 |
| 2009/0191326 | A1 * | 7/2009 | Ishizuka | G02F 1/133516 427/9 |
| 2010/0206660 | A1 * | 8/2010 | Horie et al. | 181/175 |
| 2011/0143114 | A1 * | 6/2011 | Horie et al. | 428/219 |
| 2011/0200829 | A1 * | 8/2011 | Ober | C04B 41/009 428/421 |
| 2011/0209265 | A1 | 9/2011 | Komada et al. | |
| 2014/0023895 | A1 * | 1/2014 | Ikeyama et al. | 429/82 |
| 2014/0137739 | A1 * | 5/2014 | Ishii et al. | 96/11 |
| 2015/0082984 | A1 * | 3/2015 | Maruoka et al. | 96/13 |
| 2015/0089911 | A1 * | 4/2015 | Ikeyama | 55/524 |

FOREIGN PATENT DOCUMENTS

| | | | |
|---|---|---|---|
| JP | 7-126428 | 5/1995 | |
| JP | 10-165787 | 6/1998 | |
| JP | 2004-083811 | 3/2004 | |
| JP | 2006-124506 | 5/2006 | |
| JP | 2007-016058 | 1/2007 | |
| JP | 2010-070874 | 4/2010 | |
| WO | 91/01791 | 2/1991 | |
| WO | 2009/011315 | 1/2009 | |
| WO | WO 2010032627 A1 * | 3/2010 | A42B 1/048 |

OTHER PUBLICATIONS

Machine translator Horie JP 2006-124506 May 18, 2006 15 pages.*
Machine translator Eriguchi JP 2004-083811 Mar. 18, 2004 14 pages.*
Machine translator Tokuda JP 10-165787 Jun. 23, 1998 9 pages.*
Molecular Aggregation Structure and Surface Properties of Poly(fluoroalkylacrylate) Thin Films Macromolecules (2005), 38(13), 5699-5705.*
The University of Southern Mississippi, "Polyacrylates" <http://pslc.ws/macrog/acrylate.htm> 2005, 4 pages.*
Extended European Search Report issued in corresponding European Patent Application No. 13825090.7, Mar. 1, 2016, 7 pages.

* cited by examiner

POROUS POLYTETRAFLUOROETHYLENE MEMBRANE, METHOD FOR PRODUCING THE SAME, GAS-PERMEABLE MEMBRANE AND VENTILATION MEMBER USING THE SAME

TECHNICAL FIELD

The present invention relates to a porous polytetrafluoroethylene membrane imparted with liquid repellency and a method for producing the same. The present invention also relates to a gas-permeable membrane and a ventilation member each using this porous membrane.

BACKGROUND ART

In recent years, it has been common for electronic devices, such as mobile phones, laptop computers, electronic notebooks, digital cameras, and gaming machines, to have audio functions. These devices are required to have a waterproof structure. A housing of an electronic device with audio functions is usually provided with openings located at positions corresponding to a sound emitter and a sound receiver such as a speaker, a microphone, and a buzzer. Since sound needs to be transmitted through these openings, which makes it difficult to form a waterproof structure while ensuring the audio functions. It has been attempted to ensure both sound transmission through an opening of a housing and waterproofness of the opening by covering the opening with a waterproof sound-transmitting membrane. The waterproof sound-transmitting membrane is a thin film made of a material that is less likely to block transmission of sound. Therefore, this waterproof sound-transmitting membrane placed over the opening prevents entry of water into the housing while ensuring good transmission of sound. A gas-permeable membrane that allows passage of gasses but prevents entry of water is suitable for use as such a waterproof sound-transmitting membrane, and more specifically, a gas-permeable membrane having a porous polytetrafluoroethylene (PTFE) membrane is suitable (see Patent Literature 1).

A gas-permeable membrane having a porous PTFE membrane can be used not only as a waterproof sound-transmitting membrane but also as a waterproof gas-permeable membrane or a dustproof gas-permeable membrane that allows passage of gases but prevents entry of water and/or dust. However, a gas-permeable membrane may be exposed to sebum, a surfactant, oil, or the like, depending on the environment in which the membrane is used. Even if a highly water-repellent porous PTFE membrane is used as a gas-permeable membrane, entry of a liquid with a low surface tension cannot be fully prevented. Therefore, the gas-permeable membrane is subjected to liquid-repellent treatment using a treatment agent containing a fluorine-containing polymer capable of imparting oil repellency.

It is well known that a fluorine-containing polymer having a linear perfluoroalkyl group (hereinafter, a "linear perfluoroalkyl group" may be referred to as an "Rf group") having 8 or more carbon atoms is suitable for imparting liquid repellency. Rf groups having 8 or more carbon atoms have significantly higher crystallinity than Rf groups having a smaller number of (for example, 6 or less) carbon atoms. This high crystallinity is considered to contribute to the development of excellent liquid repellency. It is also known that, due to its high crystallinity, a treatment agent having an Rf group having 8 or more carbon atoms has a large receding contact angle, (which is one of the dynamic contact angles and the other of which is an advancing contact angle). The receding contact angle increases with increasing crystallinity, and sharply increases as the number of carbon atoms increases from 6 to 8. For these reasons, it is common practice to use a treatment agent containing a fluorine-containing polymer having an Rf group having 8 or more carbon atoms so as to impart liquid repellency to a gas-permeable membrane.

CITATION LIST

Patent Literature

Patent Literature 1: JP 2004-083811 A
Patent Literature 2: JP04(1992)-506982 A

SUMMARY OF INVENTION

Technical Problem

However, the above-described conventional gas-permeable membrane imparted with liquid repellency has a drawback of being susceptible to wrinkling and sagging caused by deformation when it is cut using a die and integrated into the housing (typically, when it is attached to a portion of a microphone or speaker integrated into a housing of a mobile phone). In the conventional gas-permeable membrane imparted with liquid repellency, sound transmission is lower due to these wrinkling and sagging of the membrane.

Therefore, it is an object of the present invention to provide a porous PTFE membrane with liquid repellency enough to meet practical requirements and with reduced wrinkling and sagging caused by deformation during cutting and integration into a housing.

Solution to Problem

The present invention provides a porous PTFE membrane having a surface coated with a liquid-repellent agent. In this membrane, the liquid-repellent agent is a polymer obtained by polymerization of monomers consisting essentially of $CH_2\!=\!CHCOOCH_2CH_2C_6F_{13}$.

The present invention provides a method for producing the porous PTFE membrane of the present invention. This method includes: a forming step of forming a sheet-shaped body from a mixture containing PTFE; a first stretching step of stretching the sheet-shaped body in a first direction to form a porous membrane; a liquid-repellent treatment step of subjecting the sheet-shaped body stretched in the first direction to liquid-repellent treatment using a liquid-repellent treatment solution containing, as a liquid-repellent agent, a polymer obtained by polymerization of monomers consisting essentially of $CH_2\!=\!CHCOOCH_2CH_2C_6F_{13}$; and a second stretching step of stretching the sheet-shaped body in a second direction different from the first direction to form a porous membrane imparted with liquid repellency.

The present invention provides a gas-permeable membrane that allows passage of gases but prevents entry of liquids and/or dust. This gas-permeable membrane has a multilayer structure including the porous PTFE membrane of the present invention and a gas-permeable supporting member. The porous PTFE membrane is exposed on at least one principal surface of the gas-permeable membrane.

The present invention provides a ventilation member including: the porous PTFE membrane of the present invention or the gas-permeable membrane of the present invention; and a supporting member supporting the porous PTFE membrane or the gas-permeable membrane.

Advantageous Effects of Invention

According to the present invention, it is possible to provide a porous PTFE membrane with liquid repellency enough to meet practical requirements and with reduced wrinkling and sagging caused by deformation during cutting and integration into a housing.

DESCRIPTION OF EMBODIMENTS

Figure 1:
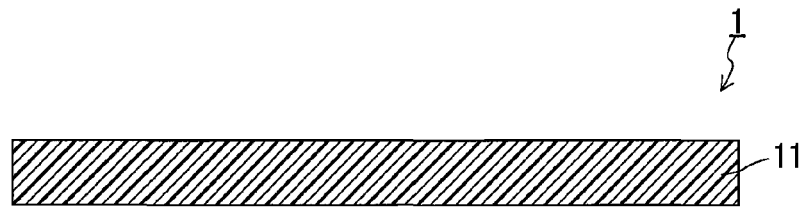
FIG. 1 is a cross-sectional view schematically showing an example of a gas-permeable membrane of the present invention.

Hereinafter, embodiments of a porous PTFE membrane imparted with liquid repellency (hereinafter also referred to as a "liquid-repellent porous PTFE membrane"), a gas-permeable membrane, and a ventilation member of the present invention are described with reference to the drawings. The following description is not intended to limit the present invention.

(Liquid-Repellent Porous PTFE Membrane)
The porous PTFE membrane of the present embodiment is a porous PTFE membrane subjected to liquid-repellent treatment and has a surface coated with a liquid-repellent agent. This liquid-repellent agent is a polymer obtained by polymerization of monomers consisting essentially of $CH_2=CHCOOCH_2CH_2C_6F_{13}$. The phrase "this liquid-repellent agent is a polymer obtained by polymerization of monomers consisting essentially of $CH_2=CHCOOCH_2CH_2C_6F_{13}$" means that the polymer constituting the liquid-repellent agent intentionally contains, as monomers, no compound other than $CH_2=CHCOOCH_2CH_2C_6F_{13}$, unless the other compounds are unavoidably present in the polymer. For example, this means that the content of $CH_2=CHCOOCH_2CH_2C_6F_{13}$ as monomers in the polymer constituting the liquid-repellent agent is at least 98.0 mol % or more, and desirably 99.0 mol % or more. The monomers in the polymer constituting the liquid-repellent agent may consist of $CH_2=CHCOOCH_2CH_2C_6F_{13}$.

In order to provide higher liquid repellent property to a porous PTFE membrane that has not been subjected to liquid-repellent treatment, the compound constituting the liquid-repellent agent needs to have a structure having a fluorine-saturated hydrocarbon group (perfluoroalkyl group: Rf group) as a side chain. As described above, in the present embodiment, an acrylate having $C_6F_{13}$ as an Rf group is used as a liquid-repellent agent.

The coating film formed of the above liquid-repellent agent has flexibility (followability) enough to prevent wrinkling and sagging of a porous PTFE membrane during cutting and integration into a housing. Therefore, the porous PTFE membrane of the present embodiment can have an elongation at break, for example, in a range of 200 to 600%. As used herein, the elongation at break refers to the elongation at maximum tensile load measured by a needle penetration test, and it is described in detail in the following Examples.

Furthermore, the liquid-repellent agent described above can impart liquid repellency enough to meet practical requirements to a porous PTFE membrane.

The porous PTFE membrane of the present embodiment also has acoustic characteristics enough to meet practical requirements. For example, the porous PTFE membrane can have a sound pressure loss of 2.0 dB or less, for example, in a range of 0.5 to 2.0 dB, at 500 Hz. The method for obtaining the sound pressure loss as used herein is as described in the following Examples.

The porous PTFE membrane to be imparted with liquid repellency is obtained by a known technique. For example, the porous PTFE membrane can be formed by forming a mixture of a PTFE fine powder and a forming aid into a sheet shape by extrusion molding and rolling, removing the forming aid from the sheet-shaped mixture to obtain a sheet as a formed body, and then stretching the sheet obtained.

The liquid-repellent treatment for the porous PTFE membrane is performed using the above-mentioned liquid-repellent agent, but the method for performing the liquid-repellent treatment is not particularly limited. The same method as a known liquid-repellent treatment method used for porous PTFE membranes can also be used in the present embodiment. As described above, the coating film formed of the above-described liquid-repellent agent has higher flexibility than coating films formed of conventional liquid-repellent agents. Therefore, the use of the above-described liquid-repellent agent makes it possible to stretch the sheet after being subjected to the liquid-repellent treatment. This means that the sheet may be subjected to the liquid-repellent treatment either before or after being stretched, as long as the above-described liquid-repellent agent is used. The liquid-repellent treatment is carried out by applying a solution prepared by dissolving the liquid-repellent agent in a solvent (liquid-repellent treatment solution) to the sheet. Examples of the specific technique for the treatment include kiss coating, gravure coating, and spray coating. Since the porous PTFE membrane is chemically stable, the type of the solvent for the liquid-repellent treatment solution is not particularly limited.

For example, in the case where the liquid-repellent treatment is performed before stretching, the method for producing a liquid-repellent porous PTFE membrane includes: a forming step of forming a sheet-shaped body from a mixture containing PTFE; a first stretching step of stretching the sheet-shaped body in a first direction (for example, in the longitudinal direction of the sheet-shaped body) to form a porous membrane; a liquid-repellent treatment step of subjecting the sheet-shaped body stretched in the first direction to liquid-repellent treatment using a liquid-repellent treatment solution containing, as a liquid-repellent agent, a polymer obtained by polymerization of monomers consisting essentially of $CH_2=CHCOOCH_2CH_2C_6F_{13}$; and a second stretching step of stretching the sheet-shaped body in a second direction (for example, in the width direction of the sheet-shaped body) different from the first direction to form a porous membrane imparted with liquid repellency.

The liquid-repellent porous PTFE membrane thus produced has a porous structure in which a huge number of voids formed between fine fibers (fibrils) of PTFE are present as pores. The average pore diameter and the porosity of this porous structure can be adjusted by changing the stretching conditions for the sheet, and the specific values of the average pore diameter and the porosity may be selected depending on the intended use of the liquid-repellent porous PTFE membrane of the present embodiment.

The liquid-repellent porous PTFE membrane of the present embodiment may be subjected to dyeing treatment. The intrinsic color of a porous PTFE membrane is white. Therefore, this porous PTFE membrane has a drawback of being conspicuous when it is placed over an opening of a housing. So, the porous PTFE membrane is subjected to dyeing treatment suitable for the housing in which the membrane is to be placed, so as to obtain a liquid-repellent porous PTFE membrane that is less conspicuous when it is placed in the housing.

The dyeing treatment can be performed, for example, by immersing a porous PTFE membrane in a dye solution containing a dye or applying a dye solution containing a dye to a porous PTFE membrane, and then by removing a solvent contained in the dye solution by drying or the like. The method for the immersion and application are not particularly limited. The dye is a dye that allows a white porous PTFE membrane not subjected to any coloring treatment to be dyed in such a manner that the whiteness of the principal surface of the membrane is 30 or less. Azo dyes, nigrosin dyes, anthraquinone dyes, procion dyes, remazol dyes, oil-soluble dyes, etc. can be used. The dye solution usually contains a dye and a solvent for diluting the dye to improve the workability of the dyeing operation. Since a porous PTFE membrane is chemically stable, the type of the solvent is not particularly limited, and can be selected as appropriate depending on the type of the dye, the workability of the dyeing operation, etc. The concentration of the dye in the dye solution needs to be such that a white porous PTFE membrane not subjected to any coloring treatment can be dyed in such a manner that the whiteness of the principal surface of the membrane is 30 or less. The concentration of the dye is usually 5 wt. % or more.

(Gas-Permeable Membrane)

The structure of the gas-permeable membrane of the present embodiment is not particularly limited as long as it includes the liquid-repellent porous PTFE membrane of the present embodiment.

FIG. 1 shows an example of the gas-permeable membrane of the present embodiment. A gas-permeable membrane 1 in FIG. 1 consists of the liquid-repellent porous PTFE membrane 11 of the present embodiment. The gas-permeable membrane 1 has the properties of allowing passage of gases but preventing entry of liquids and/or dust, by virtue of the above-described porous structure of the liquid-repellent porous PTFE membrane 11. Since the gas-permeable membrane 1 has a single-layer structure of the liquid-repellent porous PTFE membrane 11, the surface density of the gas-permeable membrane 1 can be reduced. The lower the surface density of the gas-permeable membrane 1 is, the smaller the sound transmission loss at the membrane is, and thus the better the sound transmission is. Therefore, the gas-permeable membrane 1 is particularly suitable for use as a waterproof sound-transmitting membrane adapted to be placed over an opening of a housing of an electronic device including a sound emitter and/or a sound receiver so as to ensure both sound transmission through the opening and waterproofness of the opening.

It should be understood that the gas-permeable membrane 1 is also suitable for uses other than the use as a waterproof sound-transmitting membrane, for example, the use as a waterproof gas-permeable membrane or a dustproof gas-permeable membrane with the advantages of the properties of allowing passage of gases but preventing entry of liquids and/or dust. The waterproof gas-permeable membrane (dustproof gas-permeable membrane) is placed in a housing of an automotive electrical/electronic component such as a lamp, a motor, a sensor, and an ECU, and is used to ensure ventilation between the inside and outside of the housing and reduce pressure fluctuations in the housing due to temperature changes.

The average pore diameter of the liquid-repellent porous PTFE membrane 11 in the gas-permeable membrane 1 is usually 0.01 to 20 μm, and preferably 0.05 to 5 μm. When the gas-permeable membrane 1 is used as a waterproof sound-transmitting membrane, the average pore diameter of the liquid-repellent porous PTFE membrane 11 is preferably 1 μm or less, more preferably 0.7 μm or less, and even more preferably 0.5 μm or less in order to ensure both waterproofness and sound transmission. The lower limit of the average pore diameter is not particularly limited, and it is 0.1 μm, for example. The average pore diameter of the porous PTFE membrane can be measured according to the standards specified in ASTM F 316-86. For example, a commercially available measurement apparatus capable of performing automatic measurement according to the above standards (Perm-Porometer available from Porous Material Inc., U.S.) can be used for the measurement of the average pore diameter of the porous PTFE membrane.

When the gas-permeable membrane 1 is used as a waterproof sound-transmitting membrane, the surface density of the gas-permeable membrane 1 is preferably 1 to 10 $g/m^2$, more preferably 2 to 8 $g/m^2$, and even more preferably 3 to 6 $g/m^2$ in order to ensure both the physical strength and sound transmission required for the membrane. When the gas-permeable membrane is used as a waterproof gas-permeable membrane or a dustproof gas-permeable membrane which does not require good sound transmission, the surface density of the gas-permeable membrane 1 is not particularly limited.

The liquid-repellent porous PTFE membrane 11 may be dyed black, for example. In the case where the liquid-repellent porous PTFE membrane 11 is dyed in such a color, it is less conspicuous than a white porous PTFE membrane even when the gas-permeable membrane 1 is placed over an opening of a housing of an electronic device, for example. The effects obtained by using the liquid-repellent porous PTFE membrane 11 subjected to dyeing treatment are the same for gas-permeable membranes 2, 3, and 4 shown in the subsequent FIGS. 2 and 3.

Figure 2:
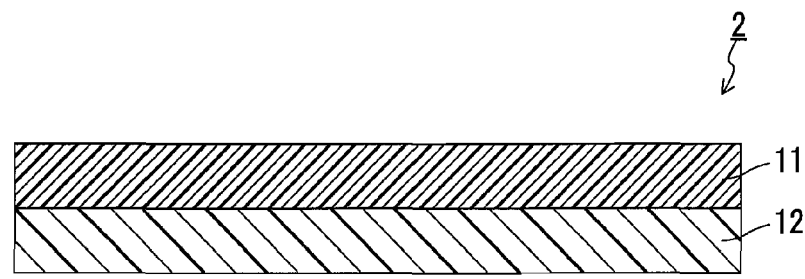
FIG. 2 is a cross-sectional view schematically showing another example of the gas-permeable membrane of the present invention.

FIG. 2 shows another example of the gas-permeable membrane of the present embodiment. A gas-permeable membrane 2 in FIG. 2 has a multilayer structure including the liquid-repellent porous PTFE membrane 11 of the present embodiment and a gas-permeable supporting member 12 supporting the porous membrane 11. The gas-permeable membrane 2 has the properties of allowing passage of gases but preventing entry of liquids and/or dust, by virtue of the above-described porous structure of the liquid-repellent porous PTFE membrane 11. In the gas-permeable membrane 2, the liquid-repellent porous PTFE membrane 11 is exposed to the outside. For example, if the gas-permeable membrane 2 is placed over an opening of a housing of an electronic device in such a manner that the liquid-repellent porous PTFE membrane 11 faces the outside of the housing, the gas-permeable membrane 2 is less conspicuous than a white porous PTFE membrane. The applications of the gas-permeable membrane 2 are not particularly limited, and it can be used suitably as a waterproof sound-transmitting membrane, a waterproof gas-permeable membrane, a dustproof gas-permeable membrane, or the like.

The material and structure of the gas-permeable supporting member 12 are not particularly limited, but preferably the gas-permeable supporting member 12 has higher gas permeability than the liquid-repellent porous PTFE membrane 11. The gas-permeable supporting member 12 is, for example, a woven fabric, a nonwoven fabric, a mesh, a net, a sponge, a foam, or a porous body made of a metal, a resin, or a composite material of these metal and resin. The resin is, for example, polyolefin, polyester, polyamide, polyimide, aramid, fluorine resin, or ultrahigh molecular weight polyethylene. When the liquid-repellent porous PTFE membrane 11 and the gas-permeable supporting member 12 are stacked, they may be joined together by any of a variety of joining methods such as heat lamination, heat welding, and ultrasonic welding.

The gas-permeable membrane 2 may have two or more liquid-repellent porous PTFE membranes 11 and/or two or more gas-permeable supporting members 12, and in this case, the order in which these layers are stacked is not particularly limited. However, in order to prevent entry of liquids and/or dust more reliably when the gas-permeable membrane 2 is placed over an opening of a housing of an electronic device, it is preferable that the liquid-repellent porous PTFE membrane 11 be exposed on at least one principal surface of the gas-permeable membrane 2, as shown in FIG. 2. In other words, the gas-permeable membrane of the present embodiment may have a multilayer structure including the liquid-repellent porous PTFE membrane of the present embodiment and a gas-permeable supporting member. In that case, it is preferable that the liquid-repellent porous PTFE membrane be exposed on at least one principal surface of the gas-permeable membrane.

The average pore diameter of the liquid-repellent porous PTFE membrane 11 in the gas-permeable membrane 2 is as indicated in the description of the gas-permeable membrane 1 shown in FIG. 1. The average pore diameter of the liquid-repellent porous PTFE membrane 11 in the case of using the gas-permeable membrane 2 as a waterproof sound-transmitting membrane is also as indicated in the description of the gas-permeable membrane 1 shown in FIG. 1. In the case where the gas-permeable membrane 2 has two or more liquid-repellent porous PTFE membranes 11, at least one of the liquid-repellent porous PTFE membranes 11 may have an average pore diameter as indicated above.

When the gas-permeable membrane 2 is used as a waterproof sound-transmitting membrane, the surface density of the gas-permeable membrane 2 (the total of the surface densities of a plurality of layers including the liquid-repellent porous PTFE membrane 11 and the gas-permeable supporting member 12) is preferably 1 to 10 g/m$^2$, more preferably 2 to 8 g/m$^2$, and even more preferably 3 to 6 g/m$^2$, in order to ensure both the physical strength and the sound transmission required for the membrane.

Figure 3:
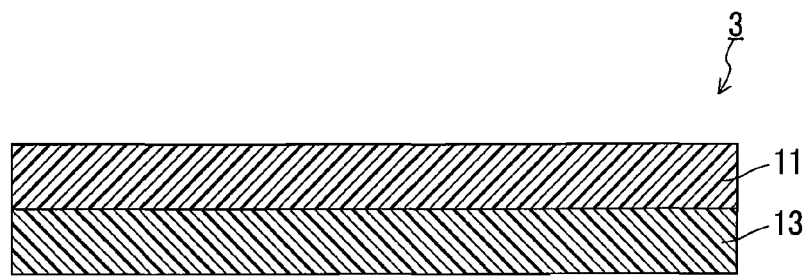
FIG. 3 is a cross-sectional view schematically showing yet another example of the gas-permeable membrane of the present invention.

FIG. 3 shows another example of the gas-permeable membrane of the present embodiment. A gas-permeable membrane 3 of FIG. 3 has a multilayer structure including the liquid-repellent porous PTFE membrane 11 of the present invention and another porous PTFE membrane 13 than the liquid-repellent porous PTFE membrane 11. The porous PTFE membrane 13 does not need to be subjected to liquid-repellent treatment, or may be subjected to liquid-repellent treatment using a known liquid-repellent agent. The porous PTFE membrane 13 may be subjected to the same liquid-repellent treatment as the treatment to which the liquid-repellent porous PTFE membrane 11 is subjected. The porous PTFE membrane 13 may be uncolored (that is, white), or may be colored in any given color (e.g., black). Like the liquid-repellent porous PTFE membrane 11, the porous PTFE membrane 13 has a porous structure in which a huge number of voids formed between fine PTFE fibers (fibrils) are present as pores. The gas-permeable membrane 3 has the properties of allowing passage of gases but preventing entry of liquids and/or dust, by virtue of the above-described porous structure of at least one porous PTFE membrane selected from the liquid-repellent porous PTFE membrane 11 and the porous PTFE membrane 13.

In the gas-permeable membrane 3, the porous membrane 11 subjected to liquid-repellent treatment is exposed to the outside. For example, if the gas-permeable membrane 3 is placed over an opening of a housing of an electronic device in such a manner that the liquid-repellent porous PTFE membrane 11 faces the outside of the housing, the gas-permeable membrane 3 can prevent entry of liquids and/or dust more reliably. That is, the gas-permeable membrane of the present embodiment may have a multilayer structure including the liquid-repellent porous PTFE membrane 11 of the present embodiment and another porous PTFE membrane 13 than the liquid-repellent porous PTFE membrane 11, and in this case, it is preferable that the liquid-repellent porous PTFE membrane 11 be exposed on at least one principal surface of the gas-permeable membrane.

The gas-permeable membrane 3 may have two or more liquid-repellent porous PTFE membranes 11 and/or two or more porous PTFE membranes 13. In this case, the order in which these layers are stacked is not particularly limited.

The applications of the gas-permeable membrane 3 are not particularly limited, and can be suitably used as a waterproof sound-transmitting membrane, a waterproof gas-permeable membrane, or a dustproof gas-permeable membrane.

In the gas-permeable membrane 3, the average pore diameter of at least one porous PTFE membrane selected from the liquid-repellent porous PTFE membrane 11 and the porous PTFE membrane 13 is as indicated in the description of the gas-permeable membrane 1 shown in FIG. 1. Also when the gas-permeable membrane 3 is used as a waterproof sound-transmitting membrane, the average pore diameter of at least one porous PTFE membrane selected from the liquid-repellent porous PTFE membrane 11 and the porous PTFE membrane 13 is as indicated in the description of the gas-permeable membrane 1 shown in FIG. 1. When the gas-permeable membrane 3 has two or more liquid-repellent porous PTFE membranes 11 and/or two or more porous PTFE membranes 13, at least one of the liquid-repellent porous PTFE membranes 11 or at least one of the porous PTFE membranes 13 may have an average pore diameter as indicated above. The average pore diameter of the liquid-repellent porous PTFE membrane 11 and the average pore diameter of the porous PTFE membrane 13 may be equal to or different from each other.

When the gas-permeable membrane 3 is used as a waterproof sound-transmitting membrane, the surface density of the gas-permeable membrane 3 (the total of the surface densities of a plurality of layers including the liquid-repellent porous PTFE membrane 11 and the porous PTFE membrane 13) is preferably 1 to 10 g/m², more preferably 2 to 8 g/m², and even more preferably 3 to 6 g/m², in order to ensure both the physical strength and the sound transmission required for the membrane.

Figure 4:
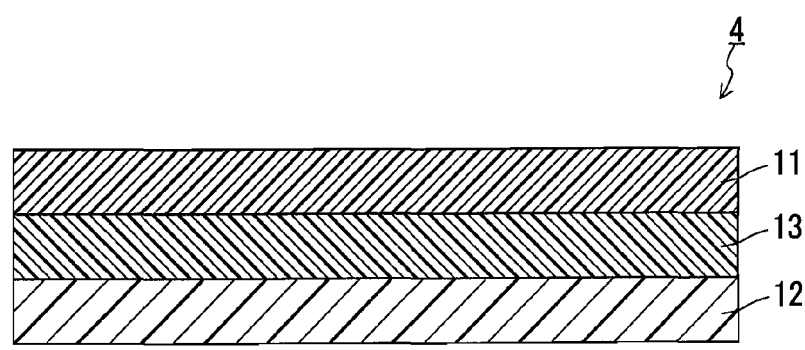
FIG. 4 is a cross-sectional view schematically showing still another example of the gas-permeable membrane of the present invention.

FIG. 4 shows another example of the gas-permeable membrane of the present embodiment. A gas-permeable membrane 4 of FIG. 4 has the gas-permeable membrane 3 shown in FIG. 3, and further has the gas-permeable supporting member 12. In the gas-permeable membrane 4, the porous membrane 11 subjected to liquid-repellent treatment is exposed to the outside. The gas-permeable supporting member 12 is as described for the gas-permeable membrane 2 shown in FIG. 2.

The gas-permeable membrane of the present embodiment may have any other member than the liquid-repellent porous PTFE membrane 11, the gas-permeable supporting member 12, and the porous PTFE membrane 13. In this case, it is preferable that the liquid-repellent porous PTFE membrane 11 be exposed on at least one principal surface of the gas-permeable membrane of the present embodiment.

(Ventilation Member)

Figure 5:
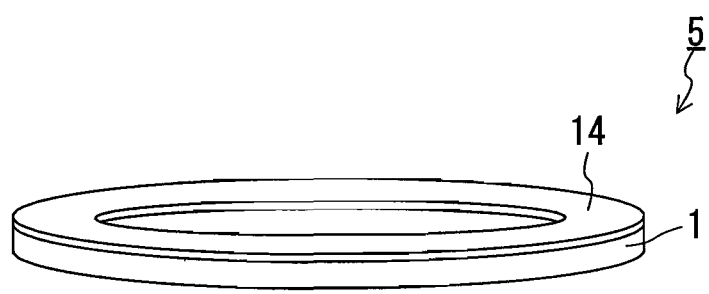
FIG. 5 is a perspective view schematically showing an example of a ventilation member of the present invention.

An example of the ventilation member of the present embodiment is shown in FIG. 5. A ventilation member 5 shown in FIG. 5 includes the gas-permeable membrane 1 of the present embodiment. The gas-permeable membrane 1 is disk-shaped, and a ring-shaped supporting member 14 is attached to an edge region of the gas-permeable membrane 1. According to the embodiment in which the ring-shaped supporting member 14 is provided, the gas-permeable membrane 1 can be reinforced, and can be handled more easily. In addition, since the supporting member 14 functions as a part to be attached to a housing of an electrical appliance, the workability of the operation of attaching the gas-permeable membrane 1 to the housing is improved. In this ventilation member, any of the gas-permeable membranes 2 to 4 or the liquid-repellent porous PTFE membrane 11 may be used instead of the gas-permeable membrane 1.

The shape of the supporting member is not particularly limited as long as it can support the gas-permeable membrane of the present embodiment. The material of the supporting member is also not particularly limited. The supporting member is typically made of a resin, a metal, or a composite material thereof.

The method of bonding the gas-permeable membrane 1 and the supporting member 14 together is not particularly limited. For example, a method such as heat welding, ultrasonic welding, bonding using an adhesive agent, or bonding using a double-sided adhesive tape, can be employed.

EXAMPLES

First, methods of evaluating liquid-repellent porous PTFE membranes fabricated in Examples will be described.

[Elongation at Break]

Figure 6A:
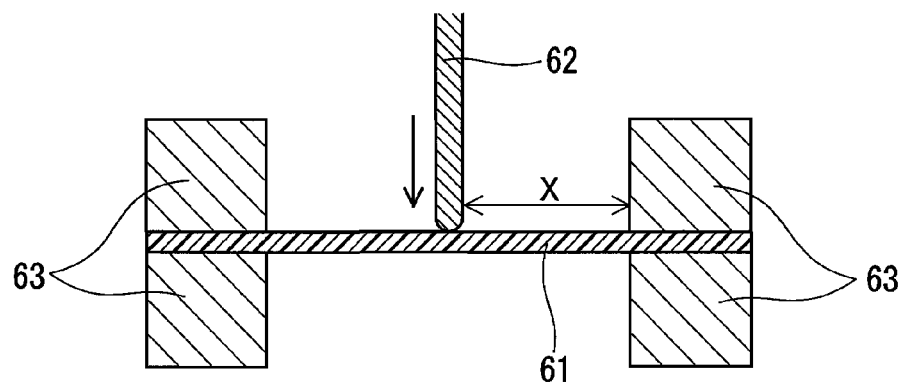
FIG. 6A and FIG. 6B are cross-sectional views for explaining the method for evaluating elongation at break.
Figure 6B:
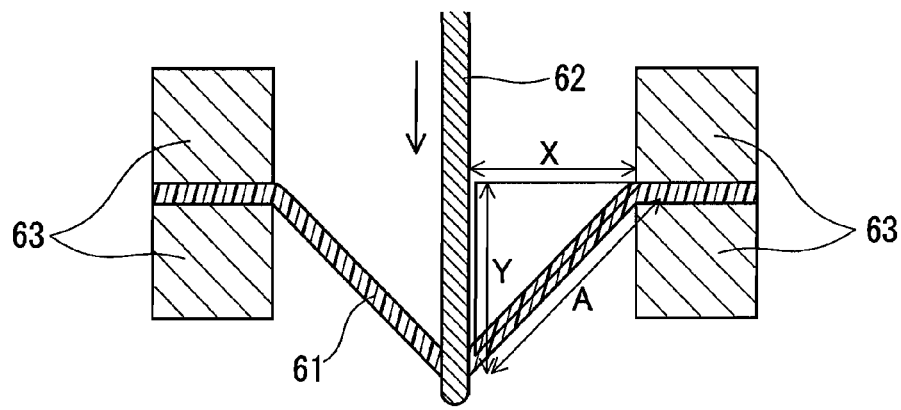

The elongation at break refers to the elongation at maximum tensile load measured by a needle penetration test (needle diameter: 2 mm) shown in FIG. 6A and FIG. 6B and is defined by the following equation. In the needle penetration test, as shown in FIG. 6A, first, a test piece 61 (here, a liquid-repellent porous PTFE membrane) was supported by a holder 63 in such a manner that the test piece was pulled tight. The tip of a needle 62 was placed on the surface of the test piece 61 at a right angle thereto and then pressed against the test piece 61 under a load. As shown in FIG. 6B, the needle 62 was pressed until it penetrated the test piece 61, and the elongation at that time (at the maximum load) was measured as the elongation at break.

$$I=\{(A-X)/X\}\times 100$$

where I is the elongation at break (elongation at maximum tensile load) (%), Y is the length of the stroke of the needle 62 at the maximum load (mm), X is the distance between the needle 62 and the sample holder 63 (mm), and A is $(X^2+Y^2)^{1/2}$.

[Acoustic Characteristics (Sound Pressure Loss)]

The acoustic characteristics of the liquid-repellent porous PTFE membranes were evaluated as follows.

First, a simulated housing (made of polystyrene and having outer dimensions of 67 mm×37 mm×12 mm) intended to be used as a housing of a mobile phone was prepared. This simulated housing was provided with a speaker mounting hole (with a diameter of 13 mm) and a speaker cable guide hole. No other opening than the speaker mounting hole and the speaker cable guide hole was provided in this simulated housing. Next, a double-sided adhesive tape (No. 5620A, with a thickness of 0.2 mm, manufactured by Nitto Denko Corporation) was die-cut into a ring shape with an outer diameter of 16 mm and an inner diameter of 13 mm. Using this ring-shaped double-sided adhesive tape, a speaker (SCG-16A, manufactured by Star Micronics Co., Ltd.) was attached to the simulated housing to cover the speaker mounting hole from inside the housing. A speaker cable was guided to the outside of the simulated housing through the guide hole. After the speaker cable was guided outside, the guide hole was sealed with putty.

Next, the liquid-repellent porous PTFE membrane of each of Examples and Comparative Examples was die-cut into a circular piece with a diameter of 16 mm using a Thomson die cutter. Using the above-mentioned ring-shaped double-sided adhesive tape, the piece of the liquid-repellent porous PTFE membrane thus obtained by die cutting was attached to the simulated housing to cover the speaker mounting hole from outside the housing. The liquid-repellent porous PTFE membrane was attached to the simulated housing so as to completely cover the speaker mounting hole without any gap between the double-sided adhesive tape and the simulated housing and between the liquid-repellent porous PTFE membrane and the double-sided adhesive tape.

Next, the speaker cable and a microphone (Type 2669, manufactured by B&K) were connected to an acoustic evaluation apparatus (Multi-analyzer System 3560-B-030, manufactured by B&K). The microphone was placed 50 mm away from the speaker mounting hole of the simulated housing.

Next, as the evaluation mode, SSR analysis (test signal of 20 Hz to 20 kHz, sweep) was selected and performed so as to evaluate the acoustic characteristics (sound pressure loss) of the liquid-repellent porous PTFE membrane. It should be noted that the blank sound pressure measured separately in the absence of the liquid-repellent porous PTFE membrane was 84 dB (at a frequency of 500 Hz).

The sound pressure loss is obtained automatically from the test signal inputted from the acoustic evaluation apparatus to the speaker and a signal received by the microphone. The sound pressure loss is the value obtained by subtracting the sound pressure measured in the presence of the liquid-repellent porous PTFE membrane from the above-mentioned blank sound pressure. The smaller value of the sound pressure loss indicates that the level of the sound outputted from the speaker was maintained better.

[Gas Permeability]

The gas permeability of each liquid-repellent porous PTFE membrane was evaluated according to JIS P 8117 (Gurley method).

[Water Entry Pressure]

The water entry pressure of each liquid-repellent porous PTFE membrane was determined using a water resistance tester (high water pressure method) specified in JIS L 1092. However, when the membrane has an area specified in JIS L 1092, the membrane is significantly deformed. Therefore, a stainless steel mesh (opening diameter of 2 mm) was provided on the opposite side of the membrane to a surface subjected to a pressure in order to reduce the deformation, and in this state, the measurement was performed.

[Liquid Repellency]

A sheet of copy paper and each liquid-repellent porous PTFE membrane were stacked together in such a manner that the sheet of copy paper was placed under the porous PTFE membrane. A drop of lamp oil was applied to the liquid-repellent porous PTFE membrane using a dropper, and then the stack was left for 1 minute. Thereafter, the porous membrane was removed, and the condition of the sheet of copy paper was checked. In the case where the sheet of copy paper was wet with the oil lamp, it was determined that the liquid repellency of the porous PTFE membrane was absent, while in the case where the sheet of copy paper was not wet, it was determined that the liquid repellency was present.

[Occurrence of Wrinkling and Sagging of Membrane During Cutting and Integration]

A 0.1 mm-thick polyethylene terephthalate (PET) film was attached to one surface of each of the liquid-repellent porous PTFE membranes obtained in Examples and Comparative Examples using a double-sided adhesive tape (No. 5603, manufactured by Nitto Denko Corporation). A double-sided adhesive tape (No. 5620A, manufactured by Nitto Denko Corporation) was attached to the other surface of the liquid-repellent porous PTFE membrane. Thus, a multilayer body was fabricated. This multilayer body was die-cut into pieces having an outer diameter of 6.0 mm and an inner diameter of 2.5 mm. Thus, 50 test samples (the number of samples N=50) was obtained. The hole with the diameter of 2.5 mm was formed only in the PET film and the double-sided adhesive tapes, that is, the hole was formed in all the layers other than the layer of the liquid-repellent porous PTFE membrane in the multilayer body. Then, each of these samples was integrated into a simulated housing (made of polystyrene, with outer dimensions of 60 mm×50 mm×25 mm) provided with a microphone mounting hole (with a diameter of 1.0 mm) so as to cover the microphone mounting hole. Then, a microphone (SPM0405HD4H, manufactured by Knowles Acoustics) was mounted and fixed to the hole by caulking so that the thickness of the sample was reduced to 70% of the original thickness before the mounting. Thereafter, the integrated sample was removed. Whether wrinkling and sagging of the samples occurred after die cutting, during integration, and after removal thereof was visually observed. How many of the 50 samples suffered from wrinkling and sagging was determined.

Example 1

An amount of 100 parts by weight of a PTFE fine powder (F 104 manufactured by DAIKIN INDUSTRIES, LTD.) and 20 parts by weight of n-dodecane (manufactured by Japan Energy Corporation) serving as a forming aid were uniformly mixed. The obtained mixture was compressed using a cylinder, and then formed into a sheet-shaped mixture by ram extrusion. Next, the sheet-shaped mixture obtained was rolled to a thickness of 0.2 mm by passing the mixture through a pair of metal rolls. Furthermore, the mixture was dried by heating at 150° C. to remove the forming aid, and thus a sheet-shaped body of PTFE was obtained. Next, the sheet-shaped body obtained was stretched in the longitudinal direction (rolling direction) at a stretching temperature of 260° C. and at a stretching ratio of 10.

Next, the porous PTFE membrane fabricated as described above was immersed for several seconds in a dye solution obtained by mixing 20 parts by weight of a black dye (SP BLACK 91-L manufactured by ORIENT CHEMICAL INDUSTRIES CO., LTD., a 25 wt. % solution diluted with ethanol) and 80 parts by weight of ethanol (purity of 95%) serving as a solvent for the dye. Thereafter, the entire porous PTFE membrane was heated to 100° C. and thereby dried to remove the solvent. Thus, a porous PTFE membrane dyed black was obtained.

Next, the porous PTFE membrane obtained was immersed for several seconds in a liquid-repellent treatment solution containing, as a liquid-repellent component, a polymer obtained by polymerization of monomers consisting essentially of $CH_2=CHCOOCH_2CH_2C_6F_{13}$. The liquid-repellent treatment solution was prepared in the following manner. First, an amount of 100 g of $CH_2=CHCOOCH_2CH_2C_6F_{13}$, 0.1 g of azobisisobutyronitrile serving as a polymerization initiator, and 300 g of a solvent ("FS thinner" manufactured by Shin-Etsu Chemical Co., Ltd.) were put into a flask fitted with a nitrogen introducing pipe, a thermometer, and a stirrer. A nitrogen gas was introduced to allow addition polymerization to proceed under stirring at 70° C. for 16 hours. Thus, 80 g of a fluorine-containing polymer was obtained. This polymer had a number average molecular weight of 100,000. The fluorine-containing polymer was diluted with a diluent ("FS thinner" manufactured by Shin-Etsu Chemical Co., Ltd.) to a concentration of 3.0 wt. %, and thus the liquid-repellent treatment solution was prepared. After being immersed in the liquid-repellent treatment solution, the entire porous PTFE membrane was heated to 100° C. and thereby dried to remove the solvent. Thus, a porous PTFE membrane subjected to liquid-repellent treatment (liquid-repellent porous PTFE membrane) was obtained.

Next, the membrane was stretched in the width direction at a stretching temperature of 150° C. and at a stretching ratio of 10, and in addition, the entire membrane was sintered at 360° C. which is the temperature above the melting point of PTFE. Thus, a liquid-repellent porous PTFE membrane was obtained. The obtained liquid-repellent porous PTFE membrane had an average pore diameter of 0.5 µm and a surface density of 6 g/m². The elongation at break, sound pressure loss, gas permeability, waterproofness, and liquid repellency of the liquid-repellent porous PTFE membrane obtained are as shown in Table 1. The occurrences of wrinkling and sagging of the membrane during cutting and integration are as shown in Table 2.

Example 2

A liquid-repellent porous PTFE membrane subjected to liquid-repellent treatment (Example 2) was obtained in the same manner as in Example 1, except that the stretching ratio in the width direction was 15. The surface density of the liquid-repellent porous PTFE membrane of Example 2 was 4 g/m². The elongation at break, sound pressure loss, gas permeability, waterproofness, and liquid repellency thereof are as shown in Table 1. The occurrences of wrinkling and sagging of the membrane during cutting, integration, and removal are as shown in Table 2.

Example 3

A liquid-repellent porous PTFE membrane subjected to liquid-repellent treatment (Example 3) was obtained in the same manner as in Example 1, except that the stretching ratio in the width direction was 7. The surface density of the liquid-repellent porous PTFE membrane of Example 3 was 8.6 g/m². The elongation at break, sound pressure loss, gas permeability, waterproofness, and liquid repellency thereof are as shown in Table 1. The occurrences of wrinkling and sagging of the membrane during cutting, integration, and removal are as shown in Table 2.

Comparative Example 1

An amount of 100 g of $CH_2=C(CH_3)COOCH_2CH_2C_8F_{17}$, 0.1 g of azobisisobutyronitrile serving as a polymerization initiator, and 300 g of a solvent ("FS thinner" manufactured by Shin-Etsu Chemical Co., Ltd.) were put into a flask fitted with a nitrogen introducing pipe, a thermometer, and a stirrer. A nitrogen gas was introduced to allow addition polymerization to proceed under stirring at 70° C. for 16 hours. Thus, 80 g of a fluorine-containing polymer was obtained. This polymer had a number average molecular weight of 100,000. The fluorine-containing polymer was diluted with a diluent ("FS thinner" manufactured by Shin-Etsu Chemical Co., Ltd.) to a concentration of 3.0 wt. %, and thus the liquid-repellent treatment solution was prepared. A liquid-repellent porous PTFE membrane subjected to liquid-repellent treatment (Comparative Example 1) was obtained in the same manner as in Example 1, except that this liquid-repellent treatment solution was used. It should be noted that the liquid-repellent porous PTFE membrane of Comparative Example 1 could not be stretched because the elongation in the width direction significantly decreased due to the liquid-repellent treatment. Therefore, the elongation at break, sound pressure loss, gas permeability, waterproofness, and liquid repellency thereof could not be evaluated. The occurrences of wrinkling and sagging of the membrane during cutting, integration, and removal also could not be evaluated.

Comparative Example 2

A liquid-repellent porous PTFE membrane subjected to liquid-repellent treatment (Comparative Example 2) was obtained in the same manner as in Example 1, except that the same liquid-repellent treatment solution as that used in Comparative Example 1 was used and the liquid-repellent treatment and dyeing treatment were performed not before stretching in the width direction but after stretching and sintering. The surface density of the liquid-repellent porous PTFE membrane of Comparative Example 2 was 6 g/m². The elongation at break, sound pressure loss, gas permeability, waterproofness, and liquid repellency thereof are as shown in Table 1. The occurrences of wrinkling and sagging of the membrane during cutting and integration are as shown in Table 2.

TABLE 1

| | Type of liquid-repellent agent | Treatment | Elongation [%] | Sound pressure loss [dB] | Gas permeability [s/100 mL] | Water entry pressure [kPa] | Liquid repellency |
|---|---|---|---|---|---|---|---|
| Ex. 1 | $CH_2=CHCOOCH_2CH_2C_6F_{13}$ | Before stretching | 347 | 1.2 | 1.0 | 150 | Present |
| Ex. 2 | $CH_2=CHCOOCH_2CH_2C_6F_{13}$ | Before stretching | 204 | 0.6 | 0.4 | 100 | Present |
| Ex. 3 | $CH_2=CHCOOCH_2CH_2C_6F_{13}$ | Before stretching | 590 | 1.9 | 2.5 | 155 | Present |
| Com. Ex. 1 | $CH_2=C(CH_3)COOCH_2CH_2C_8F_{17}$ | Before stretching | Could not be stretched due to low elongation in width direction | | | | |
| Com. Ex. 2 | $CH_2=C(CH_3)COOCH_2CH_2C_8F_{17}$ | After stretching | 117 | 2.3 | 5.9 | 150 | Present |

TABLE 2

| | Number of occurrences of wrinkling and sagging of membrane (N = 50) | | | | |
|---|---|---|---|---|---|
| | Ex. 1 | Ex. 2 | Ex. 3 | Com. Ex. 1 | Com. Ex. 2 |
| After die cutting | 0 | 0 | 0 | Could not be stretched | 1 |
| During integration | 0 | 0 | 0 | | 7 |
| After removal | 0 | 0 | 0 | | 5 |

The liquid-repellent porous PTFE membranes of Examples 1 to 3 subjected to liquid-repellent treatment using, as a liquid-repellent agent, a polymer obtained by polymerization of monomers consisting of $CH_2=CHCOOCH_2CH_2C_6F_{13}$ could be stretched because their elongation in the width direction did not decrease although they were subjected to the liquid-repellent treatment before the stretching in the width direction. In contrast, in the case where a polymer obtained by polymerization of monomers consisting of $CH_2=C(CH_3)COOCH_2CH_2C_8F_{17}$ was used as a liquid-repellent agent, the membrane could not be stretched after it was subjected to liquid-repellent treatment (Comparative Example 1), which revealed that the liquid-repellent treatment needs to be performed after stretching (Comparative Example 2). The properties such as the elongation at break and gas permeability of the liquid-repellent porous PTFE membranes of Examples 1 to 3 were superior to those of the liquid-repellent porous PTFE membrane of Comparative Example 2.

As shown in Table 2, in the liquid-repellent porous PTFE membranes of Examples 1 to 3 fabricated by using, as a liquid-repellent agent, a polymer obtained by polymerization of monomers consisting of $CH_2$=$CHCOOCH_2CH_2C_6F_{13}$, neither wrinkling nor sagging was observed after die cutting, during integration, and after removal of the membranes. In contrast, in the liquid-repellent porous PTFE membrane of Comparative Example 2, wrinkling was observed in one sample thereof during die cutting. Wrinkling observed in 7 samples during integration was eliminated in 2 samples after removal, but the wrinkling still remained in the other 5 samples.

Probably, the causes of wrinkling and sagging are as follows. First, due to the load in the thickness direction in the die cutting or caulking process, the die-cut inner diameter is reduced by about 0.2 to 0.5%; and second, in the case where the membrane cannot follow the reduced inner diameter (in the case where the membrane does not contract), wrinkling and sagging occur. Generally, when a stretched porous PTFE membrane is subjected to dyeing treatment or liquid-repellent treatment, the membrane contracts in the width direction and length direction by the residual stress by stretching. When this contraction occurs, the membrane can no longer contract in the die cutting or calking process, which is probably one of the causes of wrinkling or sagging. However, presumably, when a membrane is coated with a highly flexible liquid-repellent agent $CH_2$=$CHCOOCH_2CH_2C_6F_{13}$, like the liquid-repellent porous PTFE membrane of the present invention, the physical properties of the coating film are improved, which makes it possible to stretch the membrane in the width direction after liquid-repellent treatment, and also to prevent wrinkling or sagging from occurring by the above-described mechanism.

INDUSTRIAL APPLICABILITY

The porous PTFE membrane of the present invention can be used in the same applications as conventional porous PTFE membranes, such as use as a waterproof sound-transmitting membrane, a waterproof gas-permeable membrane, and a dustproof gas-permeable membrane.

The invention claimed is:
1. A porous polytetrafluoroethylene membrane having a surface coated with a liquid-repellent agent, wherein
the liquid-repellent agent is a polymer obtained by polymerization of a monomer consisting of $CH_2$=$CHCOOCH_2CH_2C_6F_{13}$, and
an elongation of the coated membrane at break is 200 to 600%.
2. The porous polytetrafluoroethylene membrane according to claim 1, wherein the porous polytetrafluoroethylene membrane is dyed black.
3. The porous polytetrafluoroethylene membrane according to claim 1, wherein a sound pressure loss at 500 Hz is 0.5 to 2.0 dB.
4. A method for producing the porous polytetrafluoroethylene membrane according to claim 1, comprising:
a forming step of forming a sheet-shaped body from a mixture containing polytetrafluoroethylene;
a first stretching step of stretching the sheet-shaped body in a first direction to form a porous membrane;
a liquid-repellent treatment step of subjecting the sheet-shaped body stretched in the first direction to liquid-repellent treatment using a liquid-repellent treatment solution containing, as a liquid-repellent agent, a polymer obtained by polymerization of monomers consisting essentially of $CH_2$=$CHCOOCH_2CH_2C_6F_{13}$; and
a second stretching step of stretching the sheet-shaped body in a second direction different from the first direction to form a porous membrane imparted with liquid repellency.
5. A gas-permeable membrane that allows passage of gases but prevents entry of liquids and/or dust, the gas-permeable membrane having a multilayer structure including the porous polytetrafluoroethylene membrane according to claim 1 and a gas-permeable supporting member, wherein
the porous polytetrafluoroethylene membrane is exposed on at least one principal surface of the gas-permeable membrane.
6. A ventilation member comprising:
the porous polytetrafluoroethylene membrane according to claim 1; and
a supporting member supporting the porous polytetrafluoroethylene membrane.
7. A ventilation member comprising:
the gas-permeable membrane according to claim 5; and
a supporting member supporting the gas-permeable membrane.

* * * * *